United States Patent [19]

Honma et al.

[11] Patent Number: 5,524,282
[45] Date of Patent: Jun. 4, 1996

[54] APPARATUS AND METHOD FOR DETECTING PLACE OF BURST SIGNALS IN TIME DIVISION MULTIPLEX COMMUNICATION SYSTEM

[75] Inventors: Kouichi Honma; Mitsuru Uesugi; Kazuhisa Tsubaki, all of Yokohama, Japan

[73] Assignee: Matsushita Electric Industrial Co., Ltd., Osaka, Japan

[21] Appl. No.: 672,938

[22] Filed: Mar. 21, 1991

[30] Foreign Application Priority Data

Mar. 28, 1990 [JP] Japan ................... 2-079422

[51] Int. Cl.[6] .................................................. H04B 17/00
[52] U.S. Cl. .................... 455/67.6; 455/226.1; 455/324; 375/340
[58] Field of Search .......................... 455/71, 67.1, 67.6, 455/226.1, 324; 375/99, 80, 81, 94, 102, 316, 324, 327, 340, 346, 349

[56] References Cited

U.S. PATENT DOCUMENTS 4,401,860   8/1983   Walls ........................ 455/71

Primary Examiner—Reinhard J. Eisenzopf
Assistant Examiner—Philip J. Sobutka
Attorney, Agent, or Firm—Watson Cole Stevens Davis

[57] ABSTRACT

An apparatus and a method utilized in the field of time division multiplex digital communications or the like for detecting the place of burst signals. A transmitter transmits a carrier wave modulated by message data signals having a reference signal inserted between them, and a receiver receives the transmitted modulated carrier wave. In the receiver, the received modulated carrier wave is demodulated by both a sine wave and a cosine wave each having an angular frequency deviation $\Delta\omega$ relative to the received carrier waved, the phase difference between the demodulated message data signals and the modulated reference signal is detected, the time-based change of the detected phase difference is approximated by a function of low order, the error between the phase of the received reference signal and that computed on the basis of the approximation function is computed, and a burst place detection signal is generated when the computed error is smaller than a predetermined threshold value.

9 Claims, 3 Drawing Sheets

F I G. 1
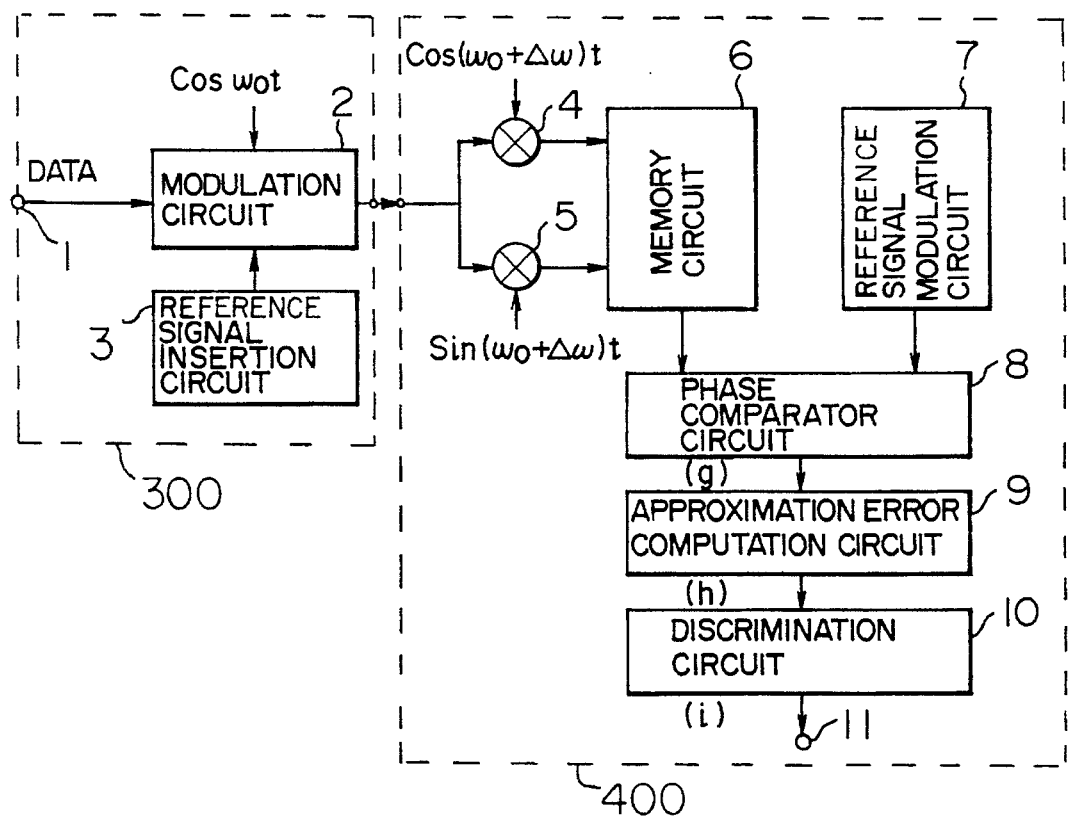

APPARATUS AND METHOD FOR DETECTING PLACE OF BURST SIGNALS IN TIME DIVISION MULTIPLEX COMMUNICATION SYSTEM

BACKGROUND OF THE INVENTION

FIELD OF THE INVENTION

This invention relates to an apparatus and method utilized in the field of time division multiplex digital mobile radio communications or the like for detecting the place of burst signals.

DESCRIPTION OF THE RELATED ART

FIG. 2 shows the structure of a conventional burst place detection apparatus. Referring to FIG. 2, message data signals are applied to a data input terminal 19, and a reference signal insertion circuit 13 inserts burst-purpose reference signals between the input data signals. In a modulation circuit 12, a carrier wave $\cos \omega_o t$ is subjected to phase modulation by the input data signals between which the reference signal is inserted. A transmitter 100 formed of these circuits transmits the carrier wave having been subjected to the phase modulation, and a receiver receives the modulated carrier wave. The receiver 200 includes multiplier circuits 14 and 15 in which carrier waves $\cos(\omega_o + \Delta\omega) t$ $\sin(\omega_o + \Delta\omega) t$ are multiplied by the received signals to generate orthogonal detected signals, respectively. The symbol $\Delta\omega$ designates an angular frequency deviation resulting from the carrier wave transmission between the transmitter and the receiver. A memory circuit 16 stores the results of multiplication by the multiplier circuits 14 and 15. A reference signal modulation circuit 17 modulates a reference signal having the same pattern as that of the reference signal inserted at the transmitter. A phase comparator circuit 18 detects the phase difference between the signals read out from the memory circuit 16 and the output signal of the reference signal modulation circuit 17. A discrimination circuit 20 decides the place of the burst signal when the level of the output signal of the phase comparator circuit 18 is lower than a predetermined threshold level.

The function of the conventional burst place detection apparatus shown in FIG. 2 is described by reference to FIG. 3 so as to compare it with that of the apparatus of the present invention. A reference signal having a waveform as shown in FIG. 3(a) is inserted by the reference signal insertion circuit 13 between message data signals applied to the data input terminal 19. The input data signals, between which the reference signal is inserted, modulate the carrier wave in the modulation circuit 12, and the modulated carrier wave is transmitted from the transmitter toward the receiver. The signals received at the receiver are subjected to the orthogonal detection by the multiplier circuits 14 and 15 in the receiver, and, as a result, common-mode components and orthogonal components are stored in the memory circuit 16. An example of the phase characteristic of the reference signal in the received signals, based on the common-mode components and the orthogonal components read out from the memory circuit 16, is shown by a solid curve in FIG. 3(b). When this phase characteristic coincides with that of the reference signal produced in the receiver, the specific signal portion can be recognized as the burst signal.

Then, the common-mode and the orthogonal component for the reference signal is produced by the reference signal modulation circuit 17, and its phase characteristic is detected as shown in FIG. 3(c). Then, the phase comparator circuit 18 detects the phase difference between these two phase signals in the reference signal duration, as shown by a solid curve in FIG. 3(d). Then, the sum total of the phase difference between the two phase signals in a duration where the reference signal lasts is incessantly calculated as shown in FIG. 3(e). When the phase characteristics of the two phase signals coincide with each other, the sum total of the phase difference is small. Therefore, when this sum total is smaller than a predetermined threshold value at a place, the reference signal shall be present at that place, and a burst place detection signal 21 as shown in FIG. 3(f) is generated from the discrimination circuit 20.

Thus, the conventional burst place detection apparatus can detect the place of the burst signal by detecting the reference signal in the manner described above.

SUMMARY OF THE INVENTION

However, the conventional burst place detection apparatus has been defective in that, when a phase variation occurs due to a deviation of the transmitted and received carrier frequency, or due to fading during transmission via the radio channel, or the like, a phase deviation appears in the reference signal between the received signals as shown by a broken curve in FIG. 3(b), and the phase difference signal generated from the phase comparator circuit 18 includes a phase deviation which is not sufficiently minimized as illustrated by a broken curve in FIG. 3(d). Therefore, there has arisen the problem that the sum total of the phase difference throughout the duration of the reference signal cannot be reduced to the value smaller than the threshold value, and the burst signal cannot be detected as will be seen in FIGS. 3(e) and 3(f). The present invention solves such a problem in the conventional apparatus, and its object is to provide a burst place detection apparatus which can reliably detect the place of the burst signal.

The present invention, which attains the above object, provides a burst place detection apparatus which comprises a transmitter transmitting message data signals and a receiver receiving the message data signals, the transmitter including:

a reference signal insertion circuit for inserting a reference signal between the message data signals to be transmitted; and a modulation circuit for modulating a transmission carrier wave by the message data signals having the reference signal inserted therebetween; and the receiver including:

a first multiplier circuit for multiplying the received modulated carrier wave by a sine wave having an angular frequency deviation $\Delta\omega$ relative to the carrier wave;

a second multiplier circuit for multiplying the received modulated carrier wave by a cosine wave having an angular frequency deviation $\Delta\omega$ relative to the carrier wave;

a memory circuit for storing the respective output signals from the first and second multiplier circuits;

a reference signal modulation circuit for generating a modulated signal of the reference signal;

a phase comparator circuit for detecting a phase difference between the multiplier output signals read out from the memory circuit and the reference signal modulated by the reference signal modulation circuit;

an approximation error computation circuit for approximating the detected phase difference by a function of a low order and computing an error between the function and the received reference signal; and a discrimination circuit for deciding whether or not the error is smaller than a predetermined threshold value and generating a burst place detection signal when the error is smaller than the threshold value.

The present invention, which attains the above object, provides a burst place detection method which comprises the steps of:

receiving a transmitted carrier wave modulated by message data signals having a reference signal inserted therebetween;

demodulating the received modulated carrier wave by a sine wave having an angular frequency deviation $\Delta\omega$ relative to the received carrier wave;

demodulating the received modulated carrier wave by a cosine wave having an angular frequency deviation $\Delta\omega$ relative to the received carrier wave;

detecting the phase difference between the demodulated message data signals and the modulated reference signal;

approximating the time-based change of the detected phase difference by an approximation function of a low order;

computing the error between the phase of the received reference signal and that computed on the basis of the approximation function; and generating a burst place detection signal when the computed error is smaller than a predetermined threshold value.

The prevent invention having features as described above is advantageous in that the burst place can be more reliably detected. This is because a noise component that may appear in the output of the phase comparator circuit due to a gradual phase variation attributable to a frequency deviation of the carrier transmitted between the transmitter and the receiver or attributable to fading in the radio channel or the like can be removed.

BRIEF DESCRIPTION OF THE DRAWINGS

FIG. 1 is a schematic block diagram showing the structure of an embodiment of the burst place detection apparatus according to the present invention.

DESCRIPTION OF THE PREFERRED EMBODIMENTS

Figure 2:
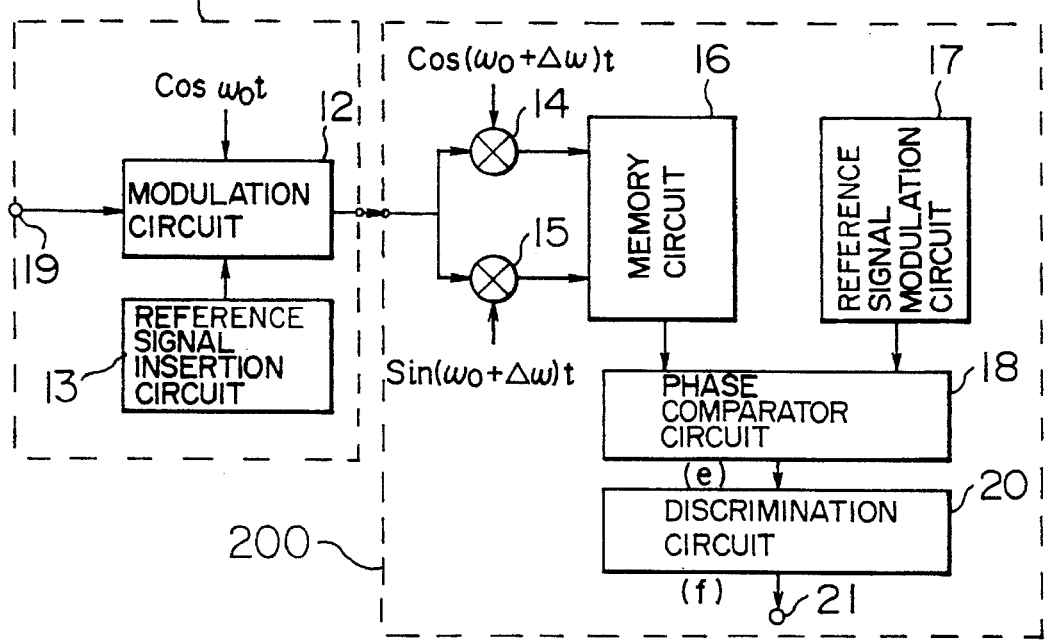
FIG. 2 is a schematic block diagram showing the structure of a prior art burst place detection apparatus.

Referring to FIG. 1, message data signals are applied to a data input terminal 1, and a reference signal insertion circuit 3 inserts a reference signal between the input data signals. In a modulation circuit 2, a carrier wave cos $\omega_o t$ is modulated by the input data signals between which the reference signal is inserted. These circuits are included in a transmitter 300. A receiver 400 includes multiplier circuits 4 and 5 which produce products of carrier waves cos($\omega_o + \Delta\omega$) and sin($\omega_o + \Delta\omega$) multiplied by the signals received from the modulation circuit 2 respectively, and which output orthogonal detected signals produced from the products, a memory circuit 6 which stores the results of multiplication by the multiplier circuits 4 and 5, a reference signals modulation circuit 7 which modulates the reference signal, a phase comparator circuit 8 which detects the phase difference between the signals read out from the memory circuit 6 and the output signal of the reference signal modulation circuit 7, an approximation error computation circuit 9, in which a time-based variation of the output signal of the phase comparator circuit 8 is linearly approximated, and by which an output signal representing the sum total of the error from the line is generated, and a discrimination circuit 10 which decides the place of the burst signal when the level of the output signal of the approximation error computation circuit 9 is lower than a predetermined threshold level and a burst place detection signal appears at an output terminal 11.

The function of the illustrated embodiment is described below. The functions of the circuits 1 to 8 are the same as those of the prior art apparatus and will not be repeatedly described herein.

Figure 3:
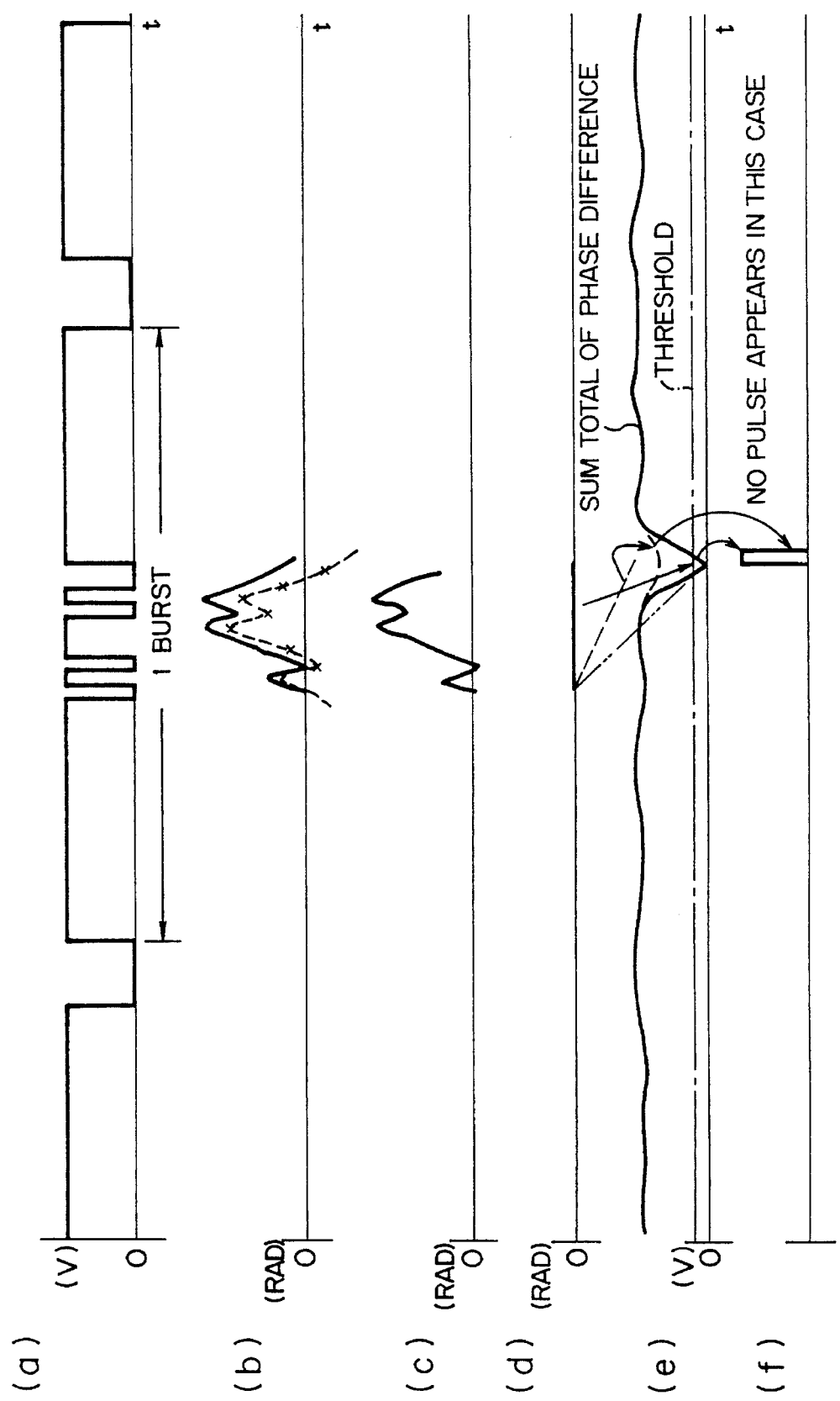
FIGS. 3(a–f) and 4(a',d',h,i) illustrate the functions of the prior art apparatus and the apparatus of the present invention.
Figure 4:
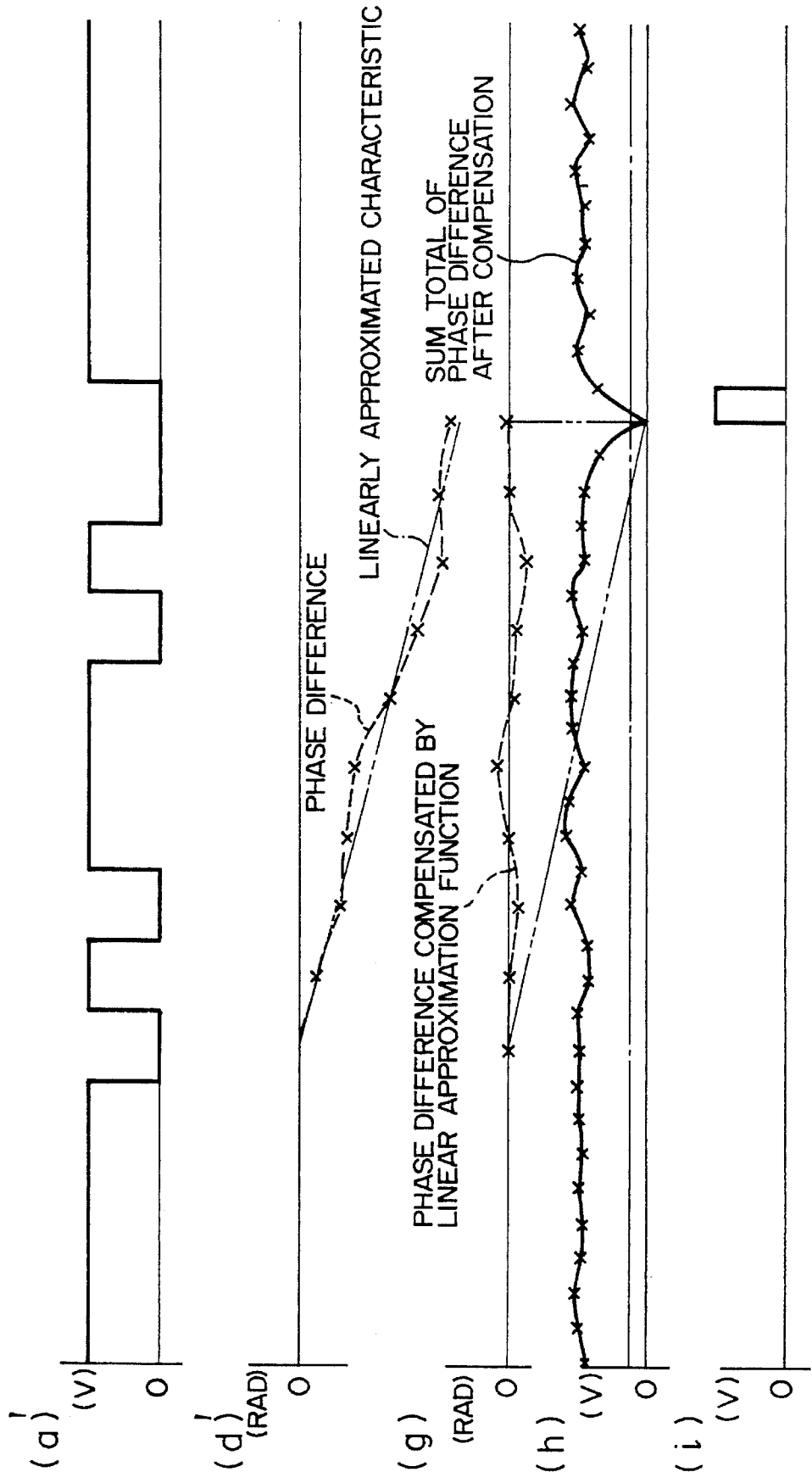

If there is an angular frequency deviation resulting from the carrier wave transmission between the transmitter and the receiver, the phase difference accumulates, and the level of the output signal of the phase comparator circuit 8 deviates gradually from the zero level as shown in FIG. 3(d). Therefore, the difference between the data part and the reference signal part decreases, and, when noise generated due to, for example, the carrier wave transmission via the radio communication channel is applied, it becomes difficult to accurately detect the place of the burst signal, as will be seen in FIGS. 3(e) and 3(f). FIG. 4(d)' shows an enlarged equivalent of the output signal of the phase comparator circuit 8 in such a case.

In Order to improve such a characteristic, the approximation error computation circuit 9 is provided in the present invention, and the output signal of the phase comparator circuit 8 is linearly approximated so as to minimize the error of the phase difference, as shown in FIG. 4(d)'. Then, the phase difference compensated by this linear approximation function is computed as shown in FIG. 4(g). Then, the sum total of the phase difference throughout the reference signal duration, for example, the sum total of the square error, is incessantly computed, and the computed value is supplied to the discrimination circuit 10. This signal is shown in FIG. 4(h). When the discrimination circuit 10 detects that the sum total of the error is smaller than the predetermined threshold value, the discrimination circuit 10 decides that the reference signal is present at that place, thereby detecting the place of the burst signal. When the deviation of the carrier frequency is constant, the phase changes linearly and can be approximated by a linear line as described above. Also, when the detection characteristic tends to vary due to, for example, fading, a function of higher order such as a function of second order or third order is preferably used for the approximation so as to further improve the detection efficiency.

It will be understood from the foregoing description of the embodiment of the present invention that a signal representing the phase difference between modulated signals of reference signals produced at a transmitter and a receiver respectively is approximated by a function of low order (a function of first order when a deviation of the frequency of a carrier wave transmitted between the transmitter and the receiver is constant), and the sum total of the error (usually, the sum total of square error) is used to detect the place of the reference signal, thereby detecting the place of the burst signal. The apparatus and method according to the present invention are advantageous in that the place of the burst signal can be reliably detected even when a phase distortion may occur due to a frequency deviation of the carrier wave transmitted between the transmitter and the receiver and also due to fading during the carrier wave transmission via the radio communication channel.

I claim:

1. A burst place detection apparatus comprising a transmitter transmitting message data signals and a receiver receiving the message data signals, said transmitter including:

a reference signal insertion circuit for inserting a reference signal between the message data signals to be transmitted; and a modulation circuit for modulating a transmission carrier wave by the message data signals having the reference signal inserted therebetween; and said receiver including: a first multiplier circuit for multiplying the received modulated carrier wave by a sine wave having an angular frequency deviation $\Delta\omega$ relative to the carrier wave;

a second multiplier circuit for multiplying the received modulated carrier wave by a cosine wave having an angular frequency deviation $\Delta\omega$ relative to the carrier wave;

a memory circuit for storing the respective output signals from said first and second multiplier circuits;

a reference signal modulation circuit for generating a modulated signal of the reference signal;

a phase comparator circuit for detecting the phase difference between the multiplier output signals read out from said memory circuit and the reference signal modulated by said reference signal modulation circuit;

an approximation error computation circuit for approximating the detected phase difference by employing a function of up to third order and computing an error of the received reference signal from the function; and a discrimination circuit for deciding whether or not the error is smaller than a predetermined threshold value and generating a burst place detection signal when the error is smaller than the threshold value.

2. A burst place detection apparatus according to claim 1, wherein said function is a linear function, and said error computed by said approximation error computation circuit is a sum total of square of phase errors of said received reference signal obtained by employing said function during a period when the reference signal exists.

3. A burst placed detection apparatus according to claim 2, wherein said approximation error computation circuit sets said function so as to minimize deviation of said phase errors from said function.

4. A receiver receiving message data signals and detecting the place of burst signals, said receiver comprising:

a first multiplier circuit for multiplying a received modulated carrier wave by a sine wave having an angular frequency deviation $\Delta\omega$ relative to the carrier wave;

a second multiplier circuit for multiplying the received carrier wave by a cosine wave having an angular frequency deviation $\Delta\omega$ relative to the carrier wave;

a memory circuit for storing the respective output signals from said first and second multiplier circuits;

a reference signal modulation circuit for generating a modulated signal of the reference signal;

a phase comparator circuit for detecting the phase difference between the multiplier output signals read out from said memory circuit and the reference signal modulated by said reference signal modulation circuit;

an approximation error computation circuit for approximating the detected phase error by employing a function of up to third order and computing the error of the received references signal from an function; and a discrimination circuit for deciding whether the error is smaller than a predetermined threshold value and generating a burst place detection signal when the error is smaller than the threshold value.

5. A receiver according to claim 4, wherein said function is a linear function, and said error computed by said approximation error computation circuit is a sum total of square of phase errors of said received reference signal obtained by employing said function during a period when the reference signal exists.

6. A receiver according to claim 5, wherein said approximation error computation circuit sets said function so as to minimize deviation of said phase errors from said function.

7. A burst place detection method comprising the steps of:

receiving a transmitted carrier wave modulated by message data signals having a reference signal inserted therebetween;

demodulation the received modulated carrier wave by a sine wave having an angular frequency deviation $\Delta\omega$ relative to the received carrier wave;

demodulating the received modulated carrier wave by a cosine wave having an angular frequency deviation $\Delta\omega$ relative to the received carrier wave;

detecting the phase difference between the demodulated message data signals and the modulated reference signal;

approximating the time-based change of the detected phase difference by employing a function of low order;

computing the error of the phase of the received reference signal and that computed on the basis of the approximation function; and generating a burst place detection signal when the computed error is smaller than a predetermined threshold value.

8. A burst place detection method according to claim 7, wherein said function is a linear function, and said time-based change computed by said approximation step is a sum total of square of phase errors of said received reference signal obtained by employing said function during a period when the reference signal exists.

9. A burst place detection method according to claim 8, wherein said function is set so as to minimize deviation of said phase errors from said function.

* * * * *